United States Patent
Mihira

(10) Patent No.: US 8,122,513 B2
(45) Date of Patent: Feb. 21, 2012

(54) DATA STORAGE DEVICE, DATA STORAGE METHOD, AND PROGRAM THEREOF

(75) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1197 days.

(21) Appl. No.: 11/398,312

(22) Filed: Apr. 5, 2006

(65) Prior Publication Data

US 2006/0227378 A1    Oct. 12, 2006

(30) Foreign Application Priority Data

Apr. 7, 2005  (JP) .................................. 2005-111069
Mar. 23, 2006  (JP) .................................. 2006-081281

(51) Int. Cl.
    *H04L 29/06*    (2006.01)

(52) U.S. Cl. ......................................... 726/27; 713/193

(58) Field of Classification Search ................ 726/7, 14, 726/21, 27–30; 713/193
    See application file for complete search history.

(56) References Cited

U.S. PATENT DOCUMENTS

| 6,983,381 B2 * | 1/2006 | Jerdonek ........................... 726/5 |
| 7,386,734 B2 * | 6/2008 | Wann et al. .................... 713/189 |
| 2002/0120561 A1 * | 8/2002 | Chin et al. ....................... 705/38 |
| 2005/0134903 A1 * | 6/2005 | Tanimoto et al. ............. 358/1.15 |

FOREIGN PATENT DOCUMENTS

| JP | 5173910 A | 7/1993 |
| JP | 2003-202803 A | 7/2003 |
| JP | 2004-13360 A | 1/2004 |
| JP | 2004-102334 A | 4/2004 |
| JP | 2004-157852 A | 6/2004 |
| JP | 2004-252953 A | 9/2004 |

* cited by examiner

Primary Examiner — Gilberto Barron, Jr.
Assistant Examiner — Simon Kanaan
(74) Attorney, Agent, or Firm — Canon USA Inc. IP Division

(57) ABSTRACT

A method of storing data that is accessible by a specific user includes issuing authentication information for confirming that a user other than the specific user has a right to use a storage area that is temporarily available within a data processing device, obtaining a data registration request sent from a terminal operated by the other user and the authentication information issued, registering data sent from a terminal of the other user in the storage area that is temporarily available, when the authentication information obtained in the obtaining step is confirmed as valid, and storing data registered in the storage area that is temporarily available, in the storage area to which an access right is given to the specific user.

11 Claims, 16 Drawing Sheets

FIG.2

DATA EXAMPLE 1

| Key | Data |
|---|---|
| One-Time Password | 7fcaaa175294ba8710565927ffd2a0a5 |
| Folder Name | /Development Division X/Development Department X |
| Upload Requesting User Name | maejima |
| Upload Requesting User ID | 12345678 |
| Expiration Date | December 31, 2006 |
| Number of Usable Times | -1 (Unlimited) |
| Temporary Storage Folder Name | 0df095742eb3f349b2db341c3331dccb |

DATA EXAMPLE 2

| Key | Data |
|---|---|
| One-Time Password | 5ff0d106b6c4bfe3e04b8de1afecf162 |
| Folder Name | /Development Division X/Development Department X/satoX |
| Upload Requesting User Name | satoX |
| Upload Requesting User ID | 12345679 |
| Expiration Date | -1 (Unlimited) |
| Number of Usable Times | 1 |
| Temporary Storage Folder Name | eb16db8a8cecf04f5e20f4e351ecefd2 |

FIG.6C

| FILE | EDIT | VIEW |

URL: https://www.cabinet-service.ne.jp/onetime/check.do

ELECTRONIC DOCUMENT STORAGE SYSTEM:
DOCUMENT REGISTRATION SCREEN

REGISTERED ONE-TIME PASSWORD TEXT: 5ff0d106b6c4bfe3e04b8de1afecf162

THE FOLLOWING FILE ALREADY EXISTS. PLEASE SPECIFY HOW TO STORE THE FILE.

| OVERWRITE SAVE | SAVE WITH NEW NAME | CONDUCT VERSION MANAGEMENT AND SAVE | CANCEL |

FILE NAME

NEW X BUILDING DESIGN.pdf

SCHEDULE DRAFT.mpp

DATA STORAGE DEVICE, DATA STORAGE METHOD, AND PROGRAM THEREOF

BACKGROUND OF THE INVENTION

1. Field of the Invention

The present invention relates to a data storage device which accepts uploading of a document through a network, a data storage method, and a program thereof.

2. Description of the Related Art

An electronic document storage system installed within a corporate network such as an intranet is concerned with a limited number of users. On the other hand, in the case of an electronic document storage system of an application service placed and operated within the Internet, the system can be used from anywhere if there is an environment that enables access to the Internet. For example, the system can be accessed from affiliate companies as well as in-house users, allowing exchange of electronic documents between such users.

However, such electronic document storage systems using the World Wide Web (WWW) each have each a unique user interface and the user needs to learn how to use the user interface in order to exchange documents using such electronic document storage system.

Besides the Internet, another commonly used method is e-mail. Japanese Patent Application Laid-Open No. 2004-133600 discusses a method of using e-mail as the interface of an electronic document storage system.

In Japanese Patent Application Laid-Open No. 2004-133600, "shared project name" and "ID generated by random numbers" are added to the message subject as an authentication key in using an electronic document storage system by e-mail. With this character string as the authentication key, operations such as "download", "upload", "gain proprietary right", and "transfer proprietary right" can be performed on the electronic document storage system. According to Japanese Patent Application Laid-Open No. 2004-133600, if the authentication key is known, all of the operations can be performed, and the shared data list can be obtained.

However, as mentioned above, there are preconditions for uploading electronic documents on the electronic document storage system, and they become a burdensome problem for users as follows.

The first problem is that the user account of the uploading user has to be managed (registered) within the electronic document storage system. This condition raises the following issues. First, it is necessary to issue a user account even in the case of a temporary usage in order to prevent unauthorized usage by a third party. In addition, the uploading user himself needs to manage the account information (user name and password).

The second problem is that an appropriate access right should be set on the user account. Due to this precondition, an appropriate access right to the folder needs to be set to the user account of the uploading user. Consequently, in the case where the uploading user belongs to an organization outside the upload requesting user, company confidential document information can be accessed if an inappropriate access right is set, which poses danger of an information leak.

The third problem is that the uploading user has to know the path to the folder to which data is uploaded. This precondition raises an issue in the case where a confidential name of a company is used as the folder name in the path to the uploaded folder. In particular, similarly to the second precondition, in the case where the uploading user belongs to an organization outside the company, the confidential information of the company which is used as the folder name can be leaked.

SUMMARY OF THE INVENTION

The present invention takes into account at least one of the above described problems. The present invention is directed to providing a data storage device, a data storage method, and a program thereof which improves the security in storing electronic documents in comparison to conventional methods, and offers convenience to users who upload and register electronic documents.

An aspect of the present invention is a data storage device that is accessible by a specific user, which includes an issuing unit configured to issue authentication information for confirming that a user other than the specific user has a right to use the storage area that is temporarily available within a data processing device, an obtaining unit configured to obtain a data registration request sent from a terminal operated by the user other than the specific user and the authentication information issued by the issuing unit, a registering unit configured to register data sent from the terminal operated by the user other than the specific user in the storage area that is temporarily available when the authentication information obtained by the obtaining unit is confirmed as valid, and a storage unit configured to store data registered in the storage area that is temporarily available, in a storage area to which the specific user is given an access right.

Another aspect of the present invention is a method of storing data that is accessible by a specific user. The method includes issuing authentication information for confirming that a user other than the specific user has a right to use a storage area that is temporarily available within a data processing device, obtaining a data registration request sent from a terminal operated by the other user, obtaining the authentication information that was issued, registering data sent from a terminal of the other user in the storage area that is temporarily available, when the authentication information obtained is confirmed as valid, and storing data registered in the storage area that is temporarily available, in the storage area to which an access right is given to the specific user.

Other features of the present invention will become apparent to those skilled in the art upon reading of the following detailed description of exemplary embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 2 illustrates a configuration of data managed in a one-time password management unit shown in FIG. 1A.

FIG. 6C illustrates a screen on which the user chooses how an electronic document is to be registered in the case where the registration processing unit should register an electronic document requested to be uploaded onto the document management DB, and a file with the same name exists.

DETAILED DESCRIPTION OF THE EXEMPLARY EMBODIMENTS

Exemplary embodiments of the invention will be described in detail below with reference to the drawings.

First Exemplary Embodiment

Figure 1A:
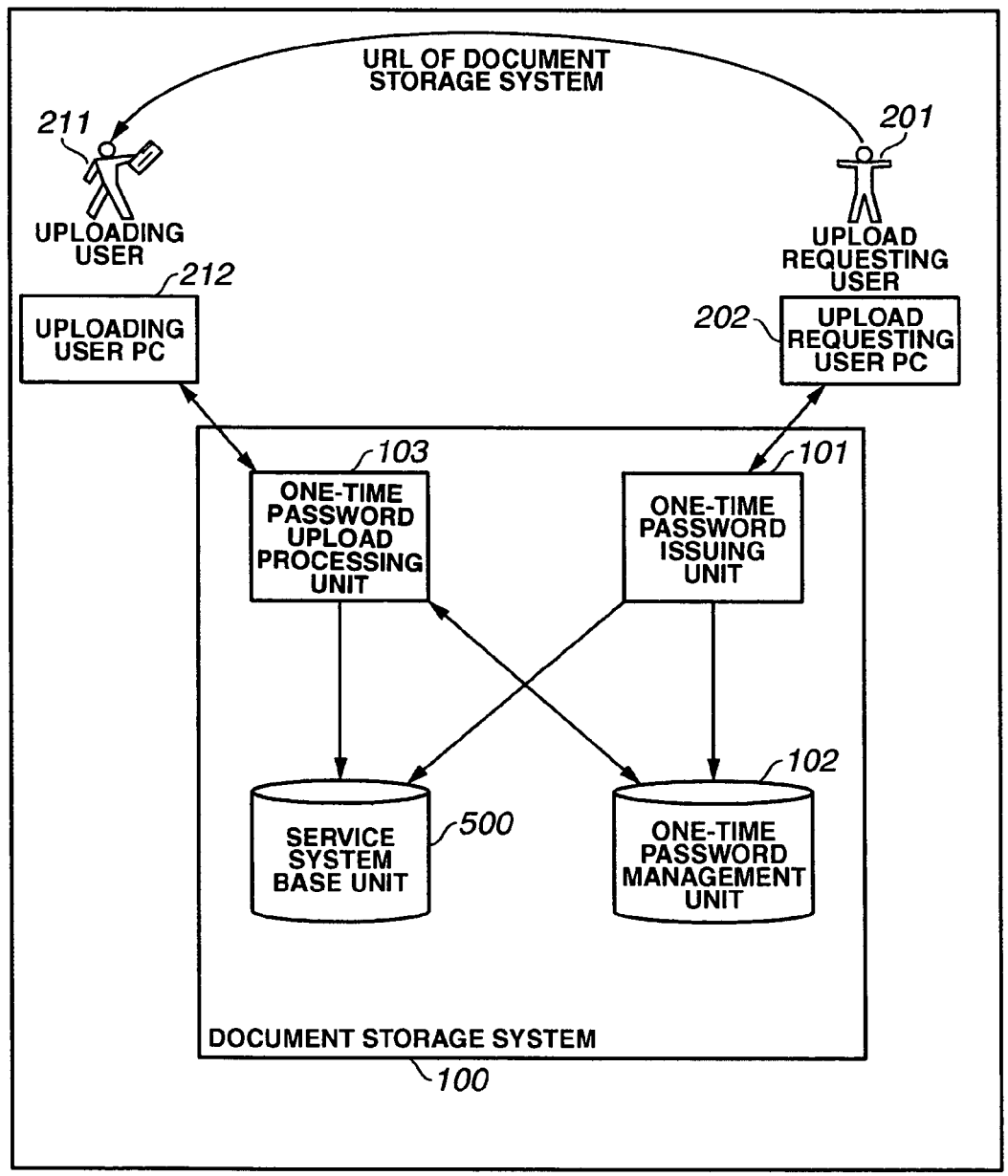
FIG. 1A is a diagram of a document storage system which is a document storage server (i.e., data storage device) and has an electronic document storage function according to the first exemplary embodiment of the present invention.

FIG. 1A is a diagram of a document storage system which is a document storage server (i.e., data storage device) and has an electronic document storage function according to the first exemplary embodiment of the present invention.

In FIG. 1A, the document storage system 100 has a function to store and manage electronic documents. The document storage system 100 is connected to a network, and a user can connect to the system from a web client through the network. The user can store (upload) electronic documents in the document storage system 100 or download documents from the document storage system 100 from anywhere at anytime if the user is in an environment that enables access to the document storage system 100.

The document storage system 100 is a file-sharing document storage system using the WWW, and it is similar to conventional systems with respect to the processes of relaying, categorizing and storing electronic documents, and file version managing of the documents. In addition, the folder of the document storage system 100 has a tree structure, and the system stores electronic documents based on categories. Furthermore, the document storage system 100 performs the functions of uploading, searching, and downloading electronic documents in the relaying process of electronic documents. Since the details of these functions have been given in the description of the conventional art, their description is omitted.

The document storage system 100 manages modifications of the electronic document. For example, the modification is managed using the version number concerning the electronic document that has the same folder and the same file name. In addition, the document storage system 100 has a function to conduct user authentication using the user name and the password to protect the confidentiality (security) of the electronic document. For example, the document storage system 100 sets an access right to every authenticated user, and determines whether to set the rights of "cannot read", "read only", "create/modify", and "delete" to the electronic document. As the details of these functions have been given in the description of the conventional art, their description is omitted.

The document storage system 100 includes a service system base unit 500 for realizing the conventional functions as described above, and also includes a one-time password issuing unit 101, a one-time password management unit 102, and a one-time password upload processing unit 103 as shown in FIG. 1A for realizing the functions of the present exemplary embodiment. A feature of the present exemplary embodiment is that a one-time password is used in the case where a user uploads a document on the document storage system 100. As a result, the security of the system is improved and convenience can be offered to the uploading user.

The one-time password issuing unit 101 issues a one-time password based on a request from the upload requesting user PC (personal computer) 202 operated by the upload requesting user 201. The upload requesting user PC 202 is a computer terminal which can be connected to the network used by the upload requesting user 201, and in which a web browser is installed. Therefore, the upload requesting user 201 uses the browser to give instructions of various processes conducted by the document storage system 100.

The one-time password management unit 102 has a function of conducting data processing based on a request from the one-time password issuing unit 101 and the one-time password upload_processing unit 103, as well as a function of storing data based on the data structure as shown in FIG. 2. FIG. 2 illustrates an example of a data structure managed by the one-time password management unit 102. As shown in FIG. 2, the one-time password management unit 102 takes on a data structure including "one-time password", "folder name", "upload requesting user name", "upload requesting user ID", "expiration date", and "number of usable times". "Expiration date" and "number of usable times" indicate the valid period of the one-time password and the number of times that it can be reused. In data example 1 of FIG. 2, "expiration date" is Dec. 31, 20XX, and "number of usable times" is unlimited (the value −1 stands for unlimited). In data example 2, "expiration date" is unlimited (−1 stands for unlimited), and "number of usable times" is set to 1. In addition, "temporary storage folder name" is a folder name used in storing the received data in the Database (DB) Unit 15.

The one-time password upload processing unit 103 receives a request (such as a request to upload) from an uploading user PC 212 operated by an uploading user 211. The one-time password upload processing unit 103 extracts the one-time password within the uniform resource locator (URL) included in the request, and makes an inquiry to the one-time password management unit 102. In the case where the one-time password is authenticated by the one-time password management unit 102, the one-time password upload processing unit 103 sends a document registration screen data to the uploading user PC 212 of the uploading user 211. As a result, a document registration screen 30 such as the one shown in FIG. 3 is displayed on the uploading user PC 212.

Figure 3:
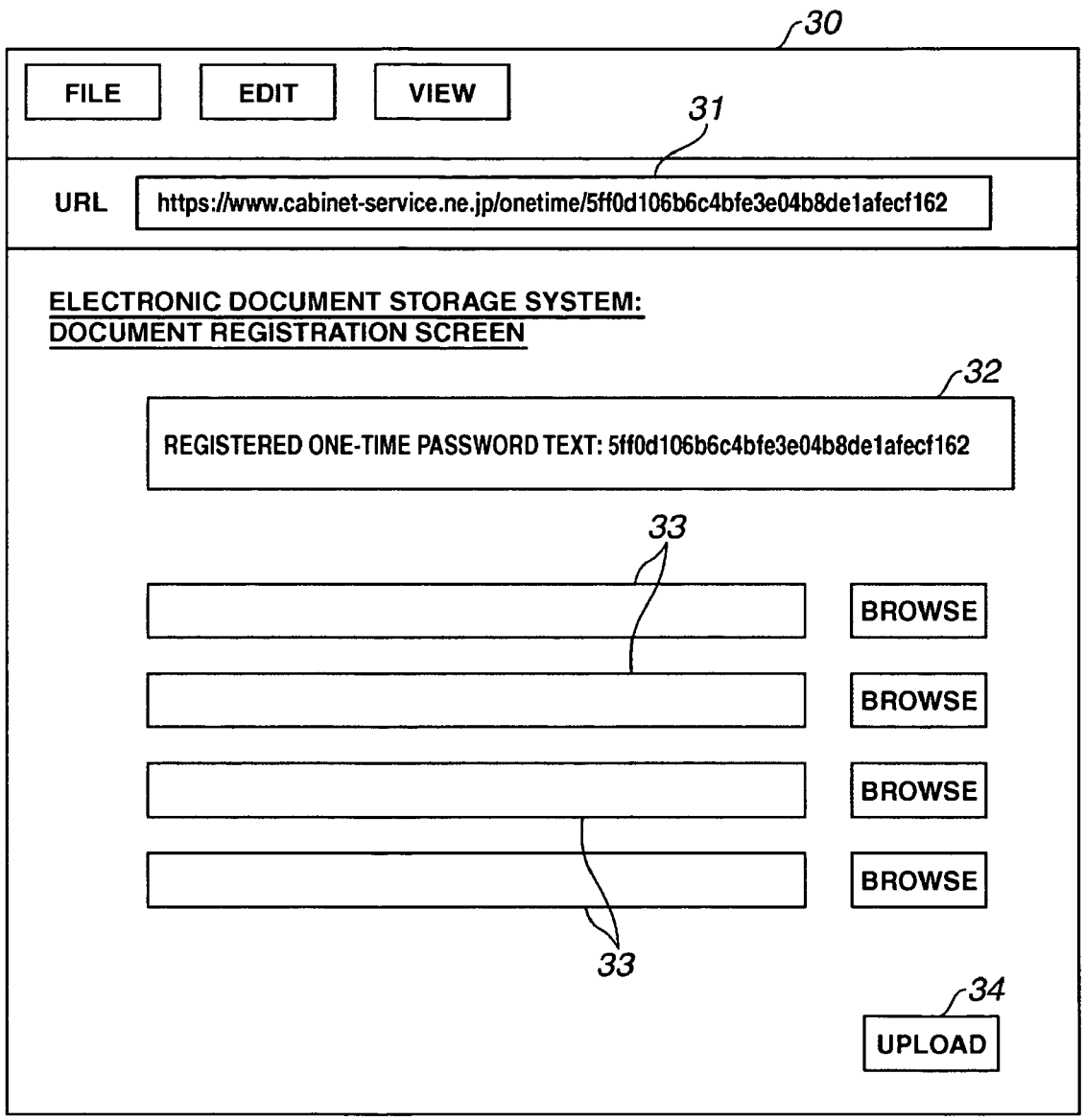
FIG. 3 illustrates a document registration screen created by a one-time password upload processing unit shown in FIG. 1A.

FIG. 3 illustrates an example of a document registration screen 30 created by the one-time password upload processing unit 103. As shown in FIG. 3, the document registration screen 30 includes a URL display field 31 for displaying the above URL, a password display field 32 for displaying the one-time password, a file name display field 33 for displaying the file name(s) of the document(s) to be registered (uploaded), and an upload button 34 for uploading the document(s) being displayed on the file name display field 33 on the document storage system 100. Since a plurality of file name display fields (four in FIG. 3) are provided, a plurality of electronic documents can be uploaded at once.

The service system base unit 500 has functions of a general electronic document storage system as described above. That is, the service system base unit 500 has functions of conducting the search after the registration to help users find the necessary document, such as user management for handling a user or group concept, document management for managing registered electronic documents, and full-text search or search based on attributes on the electronic document.

The upload requesting user 201 has a user account on the document storage system 100. More specifically, the document storage system 100 sets an access right to each folder individually for the user ID of the upload requesting user 201 or a group. The upload requesting user 201 can request to issue a one-time password for an uploading user of a third party. The one-time password enables the third party to upload a document on the folder to which an access right is granted. More specifically, the issuing of the one-time password is requested when data requesting the issuance of the one-time password is sent from the uploading request user PC 202 to the document storage system 100. With the one-time password, a document can be uploaded to a specific folder.

First, the upload requesting user 201 uses the document storage system 100 to specify the folder on which he requests a third party user to upload the documents. The folder is specified by explicitly inputting the folder path or by tracing the folder tree, both of which will be described in detail later. When the folder to be specified as the uploading folder is decided, the issuing of the one-time password for uploading on that folder is requested. Together with the issue request, the expiration date and the number of usable times are specified, the details of which will be given later. After requesting the issuing of the one-time password, the one-time password for connecting to the document storage system 100 is returned from the document storage system 100. Then, the upload requesting user 201 informs the uploading user (the above third party) to whom he wants to request uploading, of the URL including the one-time password. E-mail can be used for informing the uploading user.

Upon request from the upload requesting user 201, the uploading user 211 uploads the document on the document storage system 100 using the uploading user PC 212. However, the uploading user 211 does not have a user account (access right) to the document storage system 100. Therefore, the uploading user 211 accesses the URL for connecting to the system (URL for connecting to the document storage system 100) that is acquired from the upload requesting user 201, using the upload user PC 212. Thus, the document (electronic document) is registered in the document storage system 100. The uploading user PC 212 is a computer terminal used by the uploading user 211, and has a web browser as a module to connect to the document storage system 100.

Figure 1B:
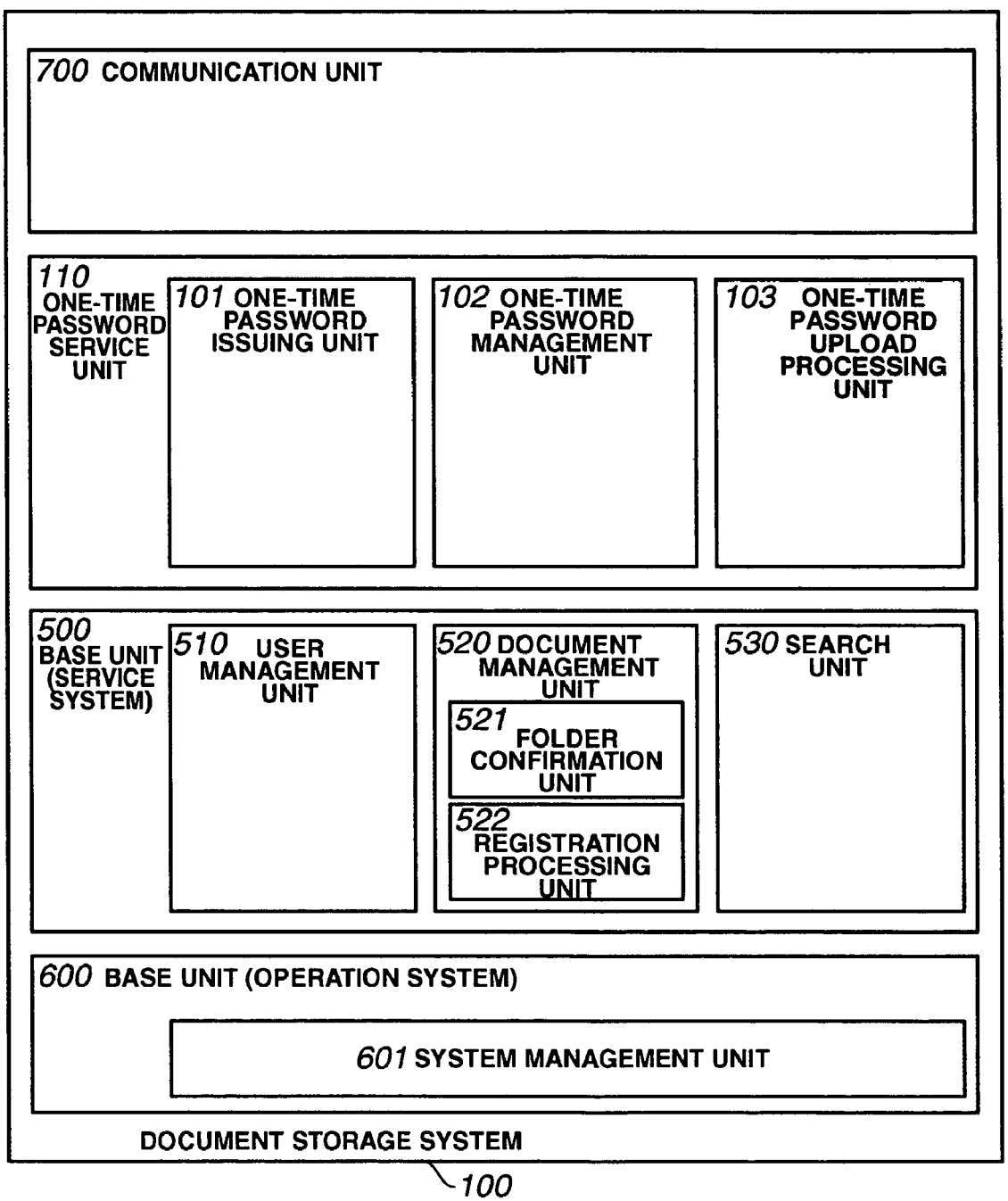
FIG. 1B illustrates in detail the functional configuration within the document storage system shown in FIG. 1A.

Next, the details of functions of the document storage system 100 as shown in FIG. 1A will be described. FIG. 1B illustrates more details of functions of the document storage system 100 as shown in FIG. 1A.

A communication unit 700 conducts sending and receiving processes, such as sending a request from the internal program of the document storage system 100 to the network, or receiving a request from each client on the network such as the upload requesting user PC 202 or the uploading user PC 212. More specifically, the communication unit 700 is realized by programs such as Apache httpd. The communication unit 700 transfers the request received from the client on the network to each internal program through the connecting URL.

The one-time password service unit 110 is a functional module including the one-time password issuing unit 101, one-time password management unit 102, and the one-time password upload processing unit 103 as shown in FIG. 1A, and conducts the processes related to the one-time password.

The service system base unit 500 includes a user management unit 510, a document management unit 520, and a search unit 530. The user management unit 510 conducts the user management in which the user or group concept is processed. The document management unit 520 conducts the document management in which the registered electronic documents are processed. The search unit 530 conducts the search to help search a document required by the user after the registration, such as a full-text search or a search based on attributes. The document management unit 520 includes a folder confirmation unit 521 and a registration processing unit 522. In response to an inquiry about a folder, the folder confirmation unit 521 confirms the existence of the folder and whether an access right to the folder exists for the upload requesting user 201. The registration processing unit 522 conducts the registration of electronic documents on the database within the document management unit 520 (to be more precise, the document management DB 520-DB which will be described later).

An operation system base unit 600 including a system management unit 601 conducts system monitoring and log management necessary in operating the document storage system 100.

Figure 1C:
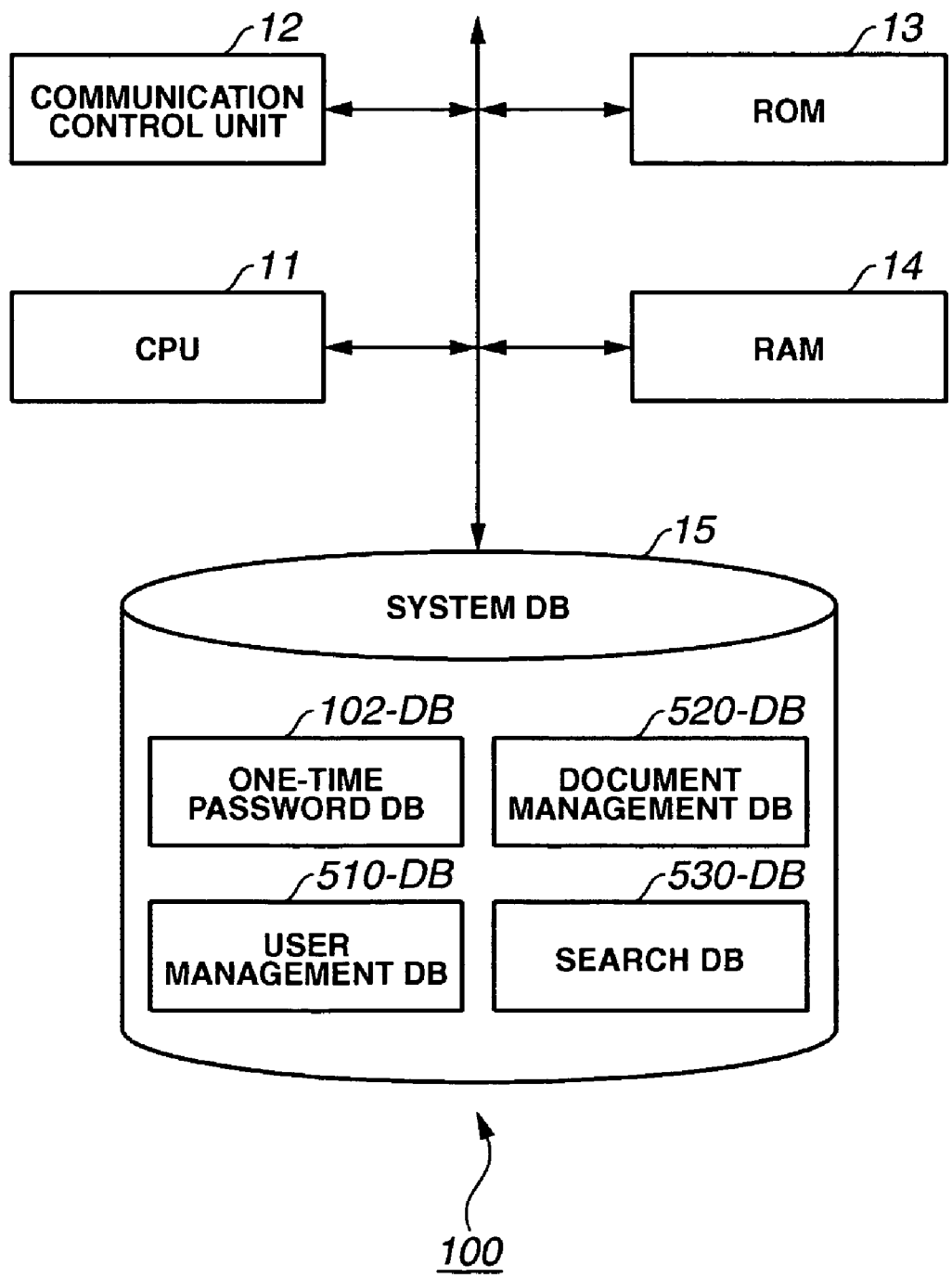
FIG. 1C illustrates a hardware configuration of the document storage system shown in FIGS. 1A and 1B.

FIG. 1C illustrates an example of a hardware configuration of the document storage system 100 shown in FIG. 1A and FIG. 1B. A communication control unit 12 controls processes of sending and receiving data in a predetermined sequence using the communication line and the communication protocol. The communication control unit 12 corresponds to the hardware portion of the communication unit 700 in FIG. 1B. A communication unit 700 controls the data communication between the upload requesting user PC 202 and the uploading user PC 212 using communication control unit 12. The Central Processing Unit (CPU) 11 controls the data flow or the operation of each processing unit within the document storing system 100. The Read Only Memory (ROM) 13 stores the programs executed by the CPU 11 in controlling the document storage system 100. The Random Access Memory (RAM) 14 is the work memory of the CPU 11. A Database (DB) Unit 15 is a nonvolatile storage medium such as a hard disk drive (HDD) storing data used in the document storage system 10. Programs executed by the CPU 11 for realizing each of the function shown in FIG. 1A and FIG. 1B are stored in either DB unit 15 or ROM 13.

As shown in FIG. 1C, a one-time password DB 102-DB, the user management DB 510-DB, the document management DB 520-DB, and a search DB 530-DB are built within the DB unit 15. The one-time password DB 102-DB stores the information (as shown in FIG. 2) about the one-time password managed by the one-time password management unit 102. The user management DB 510-DB stores the user information managed by the user management unit 510. The document management DB 520-DB stores the information about the electronic document managed by the document management unit 520. The search DB stores the information used by the search unit 530 to conduct a search.

Figure 4A:
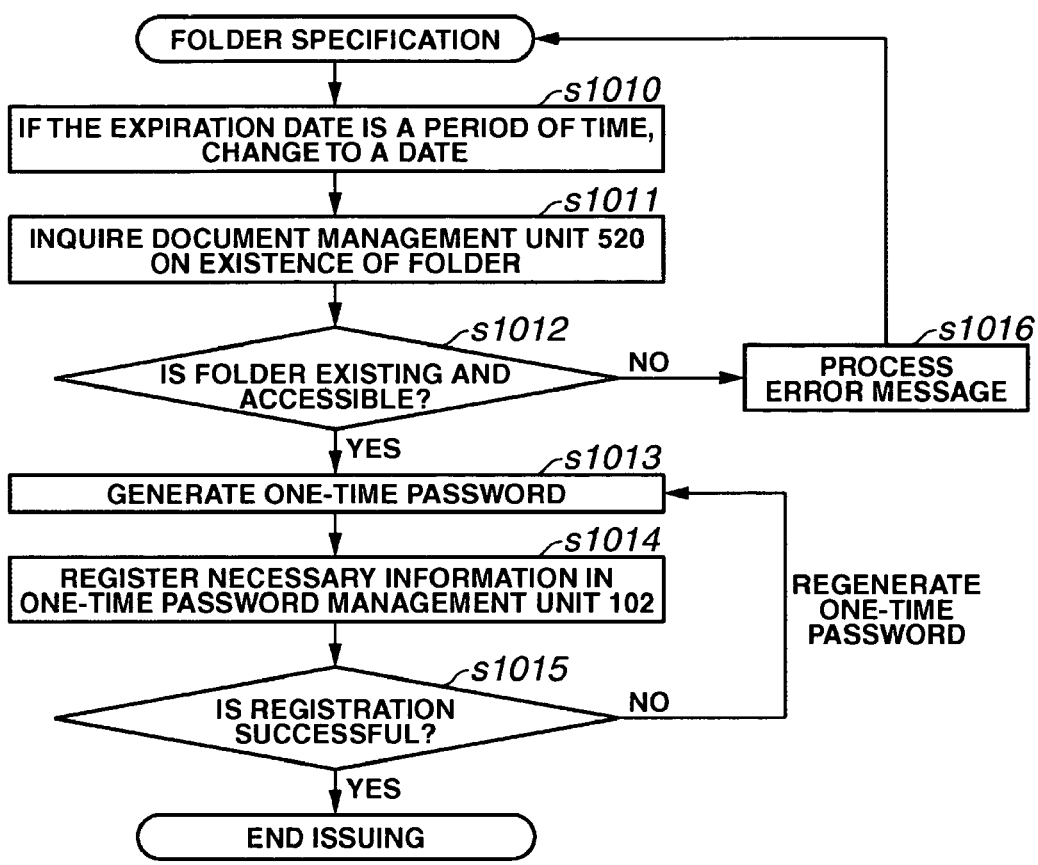
FIG. 4A is a flowchart of the process conducted by the one-time password issuing unit in the document storage system shown in FIGS. 1A and 1B.

Next, the process conducted by the one-time password issuing unit in the document storage system shown in FIGS. 1A and 1B is described. FIG. 4A is a flowchart of the process of the one-time password issuing unit in the document storage system 100 shown in FIGS. 1A and 1B. As a precondition for starting the process in FIG. 4A, the one-time password issuing unit 101 receives a request to issue a one-time password from the upload requesting user PC 202 of the upload requesting user 201. The information included in the issue request specifies the name of the folder in which the file of the requesting user is stored. The folder may be specified from the upload requesting user PC 202 after the user explicitly specifies the folder, or specifies interactively while the folder tree is being shown to the user. In the present exemplary embodiment, the one-time password issuing unit 101 provides a user interface realizing both methods to the upload requesting user PC 202.

The information included in the issue request in addition to the information specifying the folder are the expiration date and the number of usable times of the one-time password to be created. The expiration date can be set as "to Dec. 31, 20XX" or more explicitly, such as "one week later". The expiration date can be set to be unlimited without indicating the valid period. The number of usable times can also be specified by setting a finite number to limit usable times, from only once to N times, or by setting an unlimited number within the valid period. It is possible to set both the valid period and the number of usable times as unlimited. That is, the one-time password used in the present exemplary embodiment is not necessarily limited to a password that is valid only once.

In step s1010, the one-time password issuing unit 101 specifies the expiration date as follows. For example, in the case where the valid period is specified as one week, the final date of that period is obtained, and the process proceeds to step s1011. In step s1011, the one-time password issuing unit 101 makes an inquiry to the document management unit 520 to confirm the existence of the folder specified in the issue request and whether the upload requesting user 201 has an access right to the folder. The document management unit 520 searches the document management DB 520-DB to confirm the existence of the folder, confirms the access right to the folder, and returns the response to the inquiry.

Figure 4B:
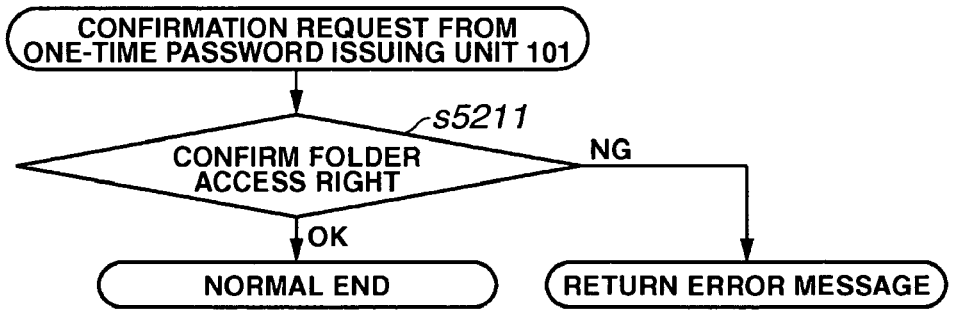
FIG. 4B is a flowchart of the process in which a document management unit confirms the existence of a folder as well as the access right to the folder with respect to the user who requests upload.

FIG. 4B is a flowchart of the process conducted by the document management unit 520 that confirms the existence of the folder by searching the document management DB 520-DB, and confirms the access right of the upload requesting user to the folder. The process in FIG. 4B starts when the inquiry is received from the one-time password issuing unit 101 in step s1011 of FIG. 4A. In step s5211, the document management unit 520 confirms the existence of the folder by searching the document management DB 520-DB, confirms the access right of the upload requesting user to the folder, and returns the result of confirmation to the one-time password issuing unit 101.

In step s1012, the one-time password issuing unit determines whether the folder is specified appropriately based on the response of the document management unit 520. If it is determined that the folder is not specified appropriately, the process proceeds to the error notification process in step s1016. After the error message is processed (e.g., displayed and/or stored in an error log), the process waits for the precondition of the one-time password issuing unit 101 receiving a request to issue a one-time password from the upload requesting user PC 202 of the upload requesting user 201.

If it is determined that the folder is specified appropriately, the one-time password issuing unit 101 generates a one-time password in the next step s1013. In step s1014, the one-time password issuing unit 101 requests the one-time password management unit 102 to register in pairs the specification information (folder, expiration date, number of usable times) designated by the user (upload requesting user 201) and included in the issue request, and the one-time password issued by the one-time password issuing unit 101, as shown in the data structure in FIG. 2. Thus, the one-time password management unit 102 registers the one-time password and the specification information, and returns a response to the one-time password issuing unit 101, informing whether the registration process is successful.

In step s1015, the one-time password issuing unit 101 determines whether the registration was successful based on the response from the one-time password management unit 102. If it is determined that the registration has failed, the process returns to step s1013, and the one-time password issuing unit 101 regenerates a one-time password. If it is determined that the registration was successful, the one-time password issuing unit 101 returns a notice that the registration was successful and the set of information including the generated one-time password to the upload requesting user PC 202. As a result, the upload requesting user 201 is able to obtain the one-time password and request the uploading user 211 to upload a document.

In the present exemplary embodiment, the uploading of a document from the uploading user PC is considered to be from a Web browser. More specifically, as described above, the document management system 100 can be accessed and the document be uploaded by accessing the URL which includes the one-time password, from the browser of the uploading user PC 212. An example of an URL including a one-time password is as follows: https://www.cabinetservce.ne.jp/onetime/5ff0d106b6c4bfe3e04b8delafecfl62

Figure 5:
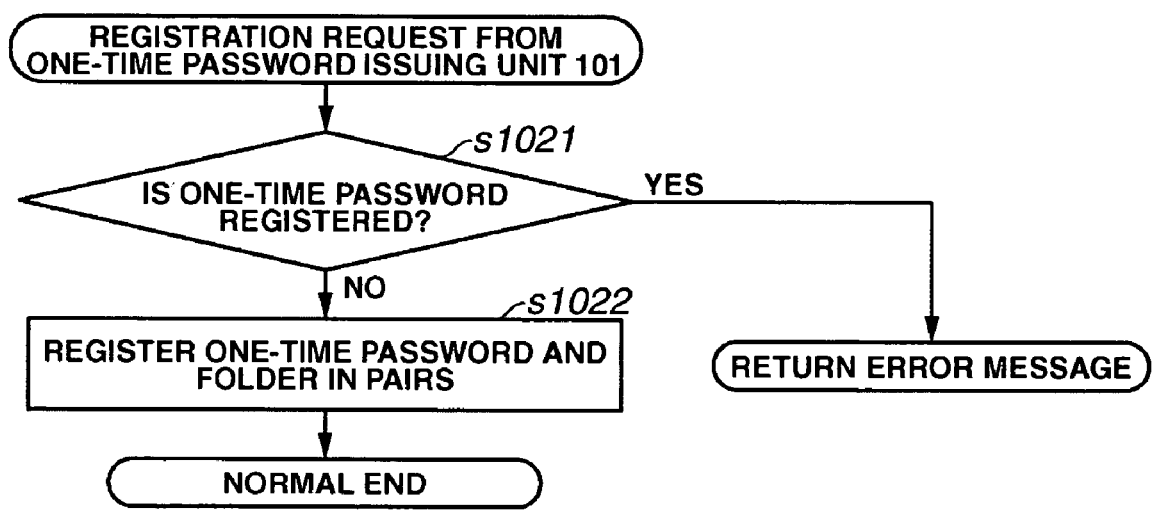
FIG. 5 is a flowchart of the process of registering a one-time password and specified information in the one-time password management unit.

Next, the process of registering a one-time password and the specification information by the one-time password management unit 102 in response to a request from the one-time password issuing unit 101 is described. FIG. 5 is a flowchart of the process of registering the one-time password and the specification information in the one-time password management unit 102. The process in FIG. 5 starts when a registration request is received from the one-time password issuing unit 101 at step s1014 in FIG. 4A.

In step s1021, the one-time password management unit 102 checks whether the one-time password concerning the registration request is not the same as an existing one-time password. In the case where the same password exists, the one-time password management unit 102 returns an error message to the one-time password issuing unit 101. In the case where the same password does not exist, the one-time password management unit 102 proceeds to step s1022 and registers the one-time password and the specification information, and after that, the one-time password management unit 102 normally ends the registration process. The process then moves to step s1014 in FIG. 4A.

The processing of a one-time password in the one-time password upload processing unit 103 is described next. FIG.

Figure 6A:
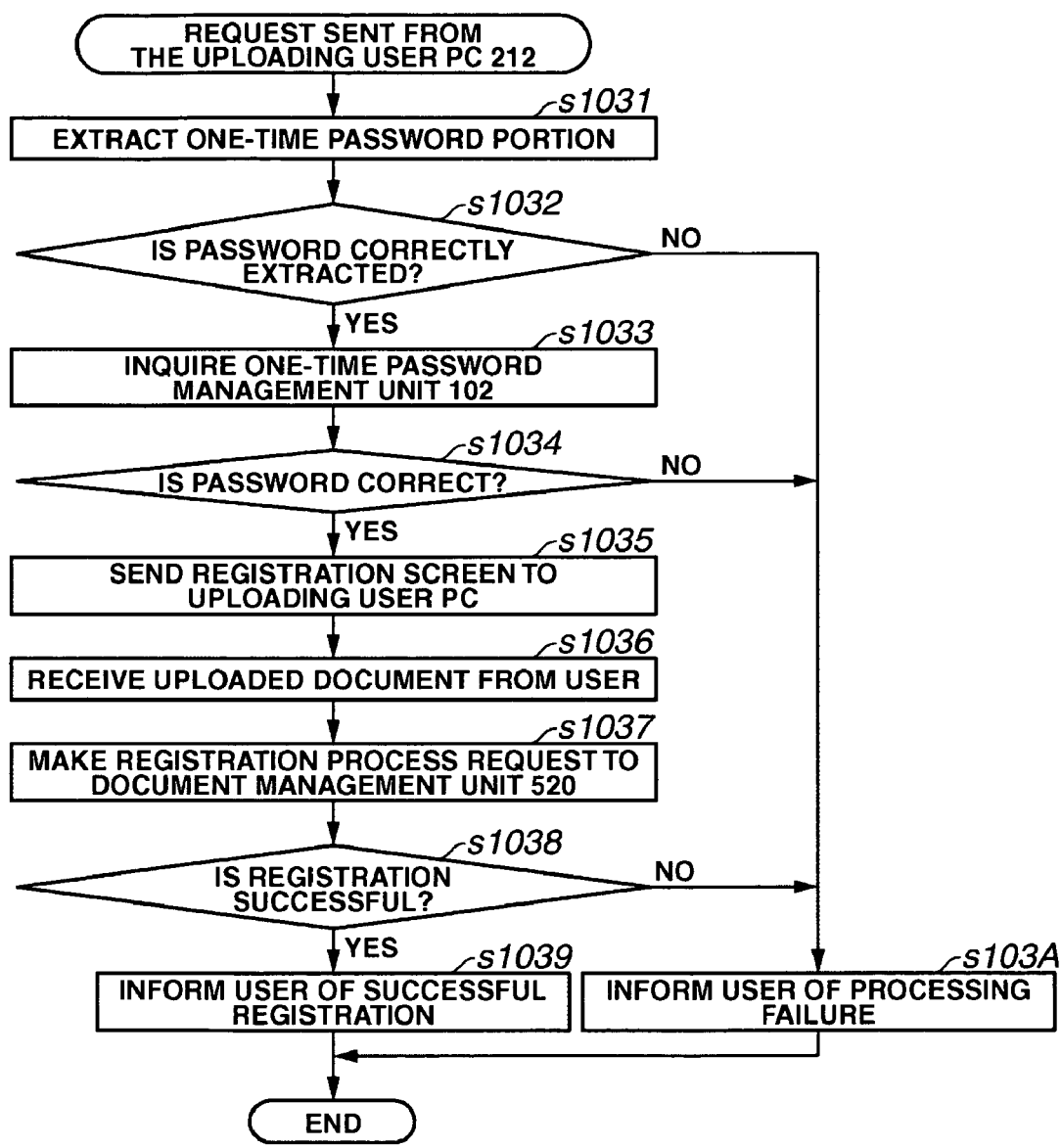
FIG. 6A is a flowchart of the processing of the one-time password in the one-time password upload processing unit.

6A is a flowchart of the processing of a one-time password in the one-time password upload processing unit 103. As a precondition for starting the process in FIG. 6A, the one-time password upload processing unit 103 receives a request from the uploading user PC 212 to upload an electronic document, and that request includes a one-time password.

In step s1031, the one-time password upload processing unit 103 extracts the one-time password in the URL. In step s1032, the one-time password upload processing unit 103 determines whether the extraction of the one-time password in step s1031 was successful. If it is determined that the extraction of the one-time password was successful, the process proceeds to step s1033, and the one-time password upload processing unit 103 inquires the one-time password management unit 102 whether the one-time password is valid. The one-time password management unit 102 returns the result of determination process about whether the one-time password is valid to the one-time password upload processing unit 103.

In step s1034, the one-time password upload processing unit 103 confirms whether the one-time password is valid based on the result of the determination received from the one-time password management unit 102. In the case where the password is valid, the process proceeds to step s1035, and the one-time password upload processing unit 103 sends screen data for displaying the registration screen 30, such as shown in FIG. 3, to the uploading user PC 212 of the user (uploading user 211). Consequently, the uploading user PC 212 displays the registration screen 30 as shown in FIG. 3. The uploading user 211 specifies the electronic document to be uploaded and depresses the upload button on the registration screen 30. The uploading user PC 212 sends a request to the one-time password upload processing unit 103 in the document storage system 100 to upload the specified electronic document.

As a response to step s1035, the one-time password upload processing unit 103 receives the upload request to upload (including the electronic document requested to be uploaded) from the uploading user PC 212 in step s1036. The received data is stored in a temporary storage folder in the DB unit 15 of the document management system 100. The name of the temporary storage folder to be used here is associated with the one-time password and is stored in the one-time password DB 102-DB in the one-time password management unit 102. A specific example of a temporary storage folder name is shown in the key in FIG. 2. The temporary storage folder name is decided by automatic generation as one of the specification information when the one-time password is generated in step s1013. The one-time folder name can also be automatically generated when the uploading process is conducted in step s1036.

In step s1037, the one-time password upload processing unit 103 requests the document management unit 520 to conduct a registration process. Three types of information are sent to the document management unit 520 in requesting the registration process. The first information is the name of the folder in which the document will ultimately be stored. The second information is the upload requesting user name for setting the owner of the file to be registered. The third information is the temporary storage folder name in which the document was temporarily stored. These three types of information are searched and obtained from the one-time password DB 102-DB using the one-time password as the key. This enables the registration processing unit 522 of the document management unit 520 to register the electronic document requested to be uploaded by the one-time password upload processing unit 103 onto the document management database 520-DB. At this stage, the registration processing unit 522 returns a message to the one-time password upload processing unit 103 informing whether the registration was successful. In addition, after the process returns from the registration processing in the document management unit 520, the electronic document requested to be uploaded and stored in the temporary storage folder is deleted, irrespective of whether the registration was successful.

Figure 6B:
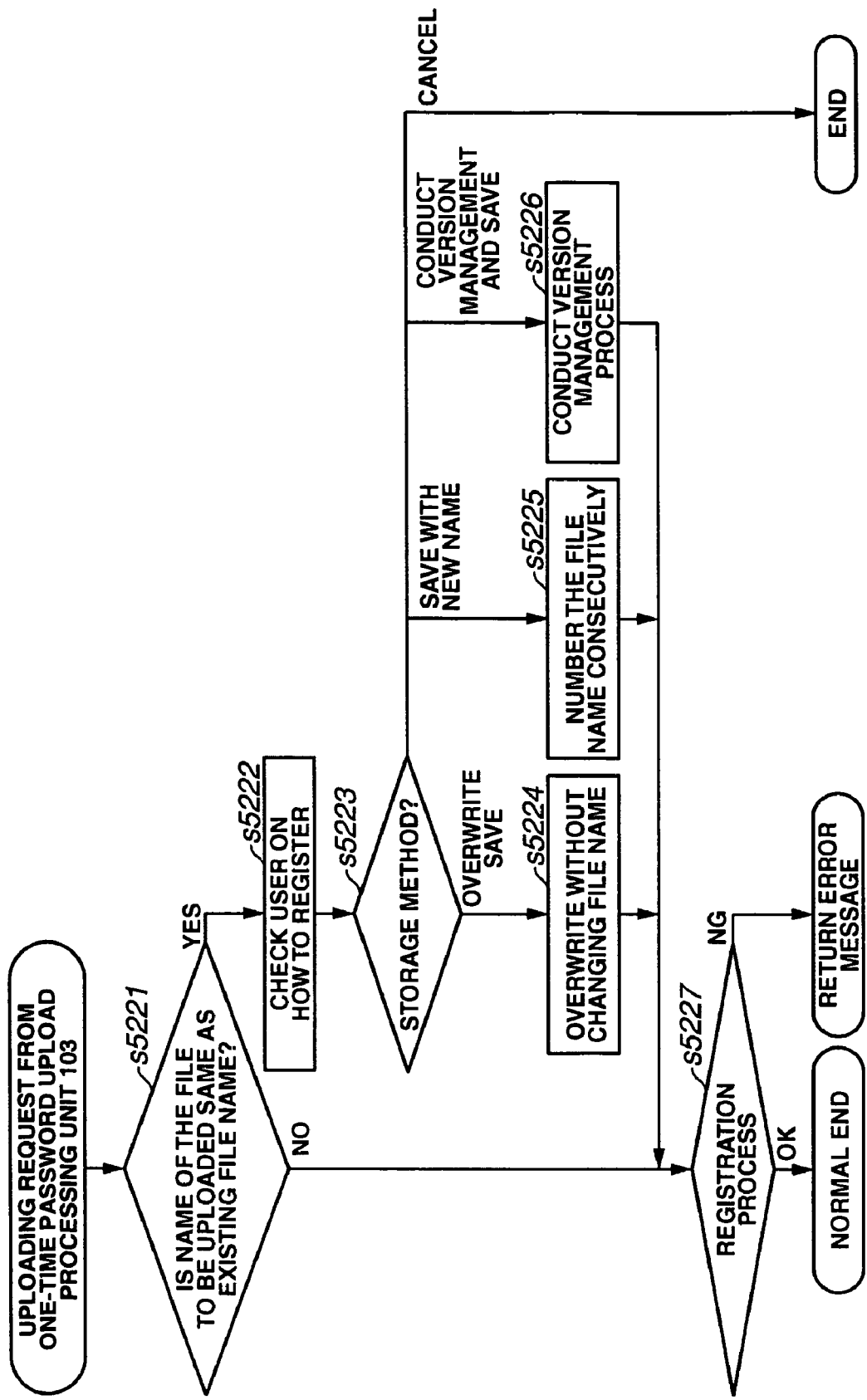
FIG. 6B is a flowchart of the process in which a registration processing unit registers an electronic document which the user requests to upload, on a document management DB.

FIG. 6B is a flowchart of the process in which the registration processing unit 522 registers the electronic document that should be uploaded on the document management DB 520-DB. The process in FIG. 6B starts upon receiving the registration process request from the one-time password upload processing unit 103 in step s1037. In step s5221, the registration processing unit 522 determines whether a file with the same name as the file that is to be registered exists in the destination folder. If the same file name does not exist, the process proceeds to step s5227, and the registration process is conducted using the file name of the uploading user, and the result of the process (error or normal) is returned to the one-time password upload processing unit 103. On the other hand, in the case where it is determined that the same file name exists in step s5221, a user confirmation screen such as the one shown in FIG. 6C is displayed in step s5222. On the user confirmation screen, the user chooses how the file is to be registered, and the process to be conducted in each of the subsequent steps is decided. In the case where overwrite save is chosen, the file is overwritten on the existing file with the file name as it is, as shown in step s5224. In the case where save with a new file name is chosen, a part of the file name is numbered consecutively, and the file is stored with the new file in step s5225. For example, in the case where the file name is "SHEDULE DRAFT.mmp", the file is saved with a new name, "SCHEDULE DRAFT-1.mpp". In the case where save using version management is chosen, the version management function of the document management system in step s5226 is used to register the file to be registered as the present version after saving in the previous version on the document management system. In the case where cancel is chosen, the process is ended without conducting the registration process. In the case where the same file name exists, after each of the processes in steps s5224, s5225, and s5226 is conducted, the registration process is conducted on the file to be registered with the specific file name in step s5227. Then, the processing result is returned to the one-time password upload processing unit. Such a process on the file with the same name is conducted in order to enable the user to replace data within the valid period or the password.

In step s1038 (of FIG. 6A), the one-time password upload processing unit 103 determines whether the registration process was successful based on the result sent from the registration processing unit 522. If it is determined that the registration was successful, the one-time password upload processing unit 103 sends back the message about the success of the registration to the uploading user PC 212 in step s1039, and the process ends. Thus, the uploading user 211 can confirm that the uploading was successful. If the result of one of steps s1032, s1034, or s1038 is negative, the process proceeds to step s103A, and the one-time password upload processing unit 103 sends a message to the uploading user PC 212 that the registration has failed, and the process ends.

Figure 7:
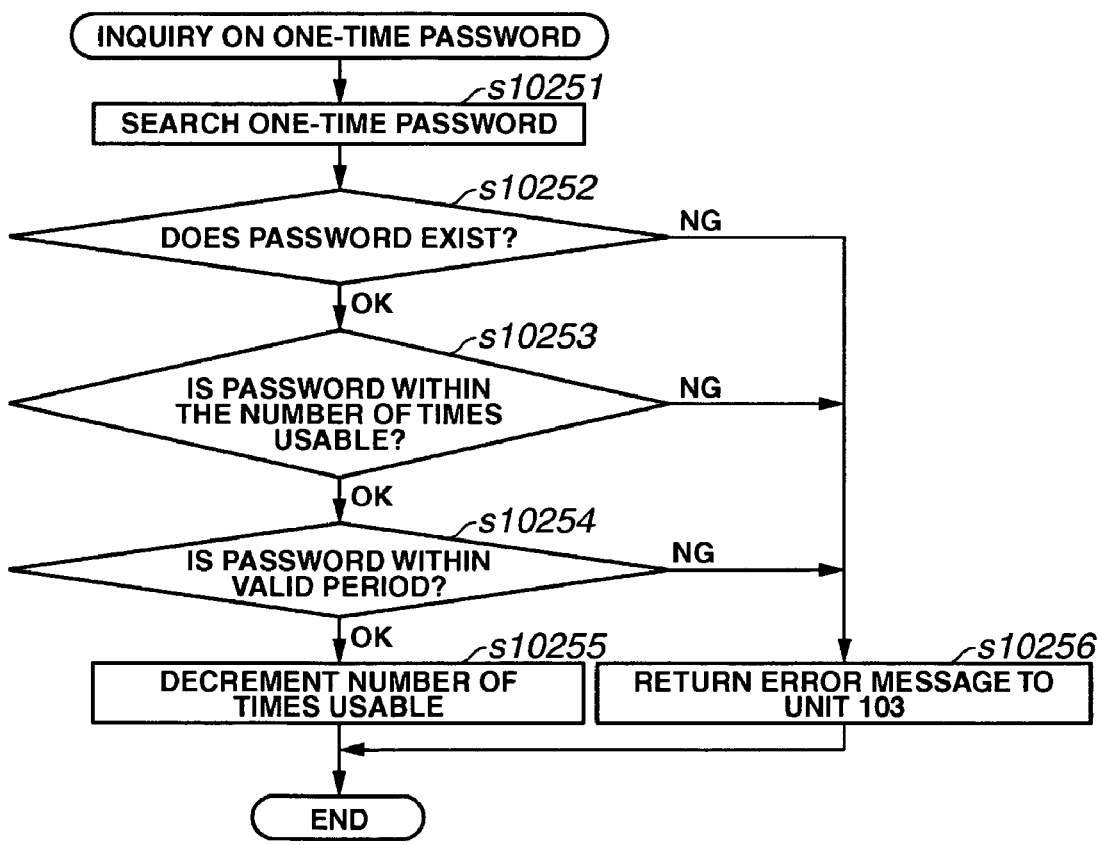
FIG. 7 is a flowchart of a process of confirming the validity of a one-time password in the one-time password management unit.

Next, the process of confirming the validity of the one-time password in the one-time password management unit 102 is described. The process is performed in response to the inquiry from the one-time password processing unit in step s1033 of FIG. 6A. FIG. 7 is a flowchart of the process of confirming the validity of the one-time password conducted by the one-time password management unit 102.

As shown in FIG. 7, in step s10251, the one-time password management unit 102 conducts a search as to whether the one-time password exists in the database (one-time password DB 102-DB) in response to the inquiry from the one-time password upload processing unit 103. In step s10252, the one-time password management unit 102 determines whether the one-time password exists based on the search result. If it is determined that the one-time password exists, the process proceeds to step s10253, and the one-time password management unit 102 refers to the set number of usable times about the one-time password, to determine whether the usage is within the valid number.

If it is determined that the usage is within the valid number, the one-time password management unit 102 proceeds to step s10254 and refers to the set valid period of the one-time password to determine whether the usage is within the valid period. If it is determined that the usage is within the valid period, the one-time password management unit proceeds to step s10255 to decrement the number of usable times in the one-time password DB 102-DB and sends back a message to the one-time password upload processing unit 103 to inform that the one-time password is valid. In the case where the result of any of step s10252, s10253, and s10254 is negative, processing proceeds to step s10256 and an error message is sent back to the one-time password upload processing unit 103 and processing ends.

In the above exemplary embodiment, an electronic document was taken as the subject of storage in the document storage system. However, the subject of storage is not limited to the document, but various contents available on the Internet such as still and video image files may be stored and managed in the document storage system. In addition, although the computer terminal was taken as the terminal used by the uploading user 211, the terminal is not limited to the computer terminal, and other devices, e.g., cellular phones, may be used that can be connected to the Internet and can send attached electronic images.

Second Exemplary Embodiment

In the above first exemplary embodiment, an uploading user conducts the uploading operation using the Web interface. In the second exemplary embodiment, the uploading operation is conducted using e-mail. The following description of the second exemplary embodiment focuses on differences from the first exemplary embodiment and detailed descriptions of common features and functions will not be repeated here.

Figure 8A:
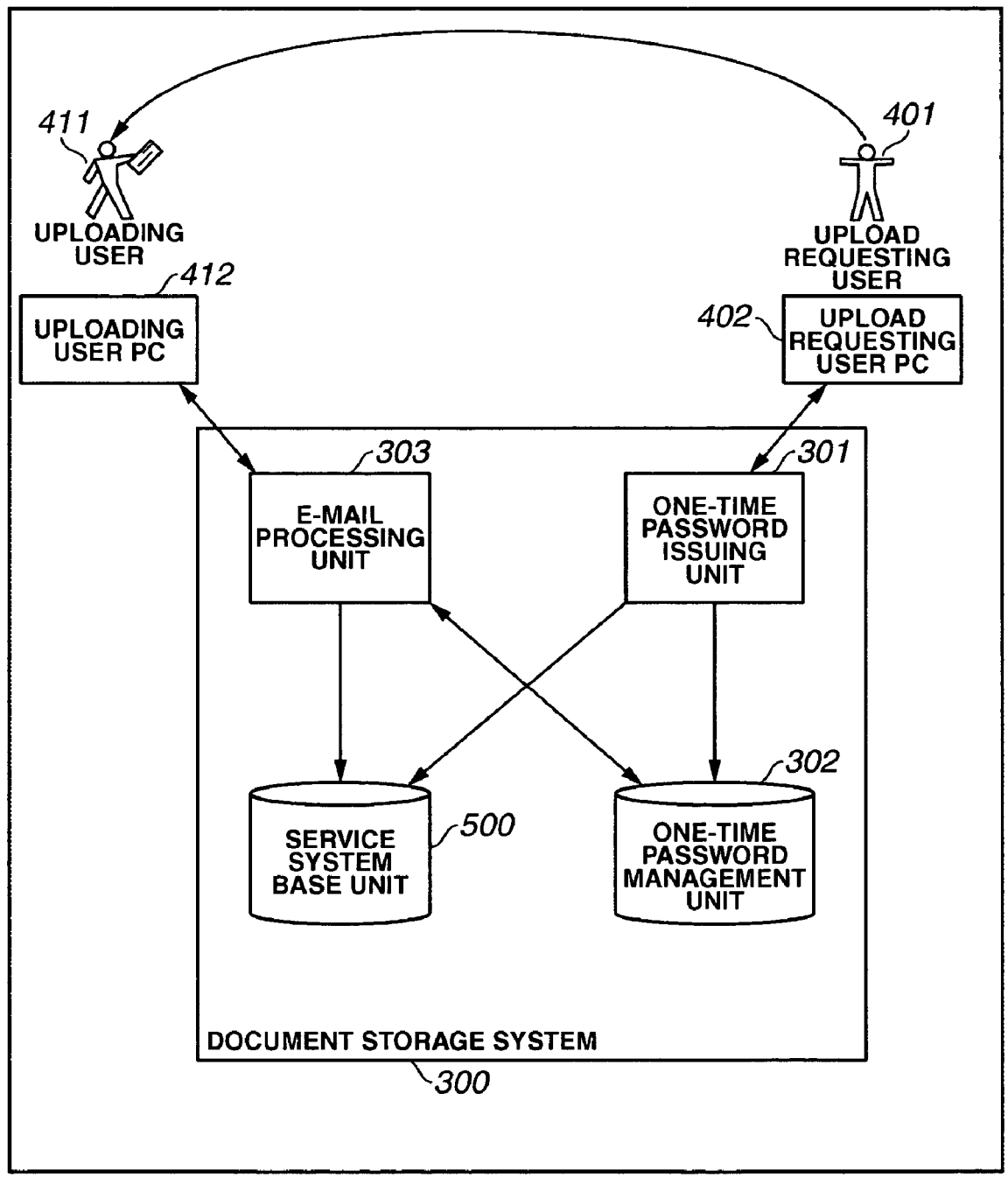
FIG. 8A is a diagram of a document storage system which is a document storage server (i.e., data storage device) and has an electronic document storage function according to a second exemplary embodiment in the present invention.
Figure 8B:
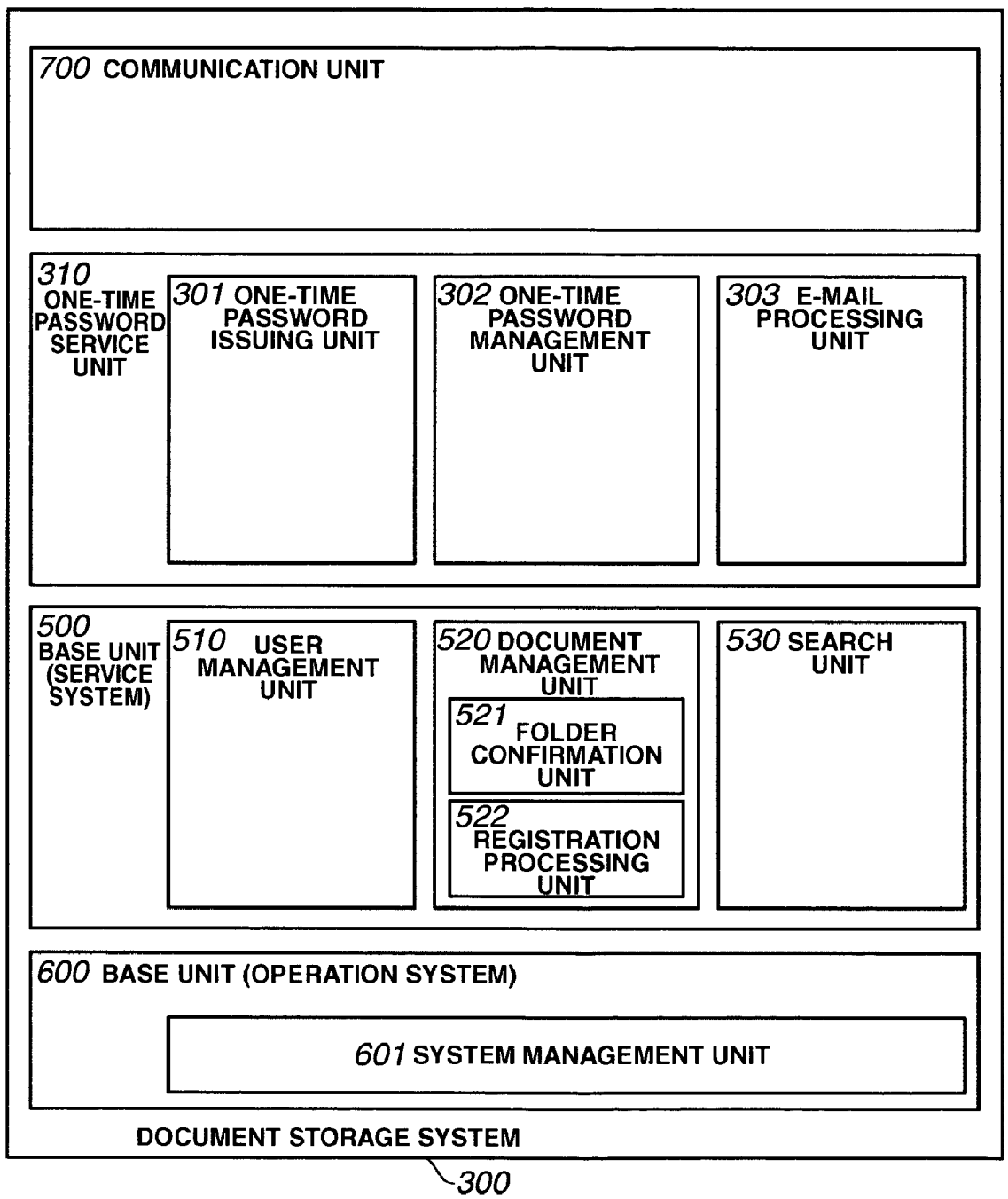
FIG. 8B illustrates in detail the functional configuration within the document storage system shown in FIG. 8A.

In FIG. 8A, a document storage system 300 has a function to store and manage electronic documents. The document storage system 300 in FIG. 8A differs much from the document storage system 100 in FIG. 1A in that the system includes an e-mail processing unit 303 instead of the one-time password upload processing unit 103. That is, as shown in FIG. 8B, the functional configuration of the document storage system 300 in FIG. 8A is almost the same as the document storage system 100 in FIG. 1B. The one-time password issuing unit 301 and the one-time password management unit 302 in the one-time password service unit 310 are essentially the same as the one-time password issuing unit 101 and the one-time password management unit 102 in the one-time password service unit 110 discussed above. The one-time password processing unit 103 shown in FIG. 1B is replaced by the e-mail processing unit 303 in FIG. 8B. In addition, the hardware configuration of the document storage system 300 is the same as the document storage system 100 as shown in FIG. 1C.

An upload requesting user 401, an upload requesting user PC 402, an uploading user 411, and an uploading user PC 412 shown in FIG. 8A conduct the same operations and have the same functions as the upload requesting user 201, the upload requesting user PC 202, the uploading user 211, and the uploading user PC 212 in FIG. 1A. Moreover, the functions of the one-time password issuing unit 301 and the one-time password management unit 302 in FIG. 8A are almost the same as the one-time issuing unit 101 and the one-time password management unit 102, and the following description will mainly be of the different points.

First, the difference of the one-time password issuing unit 301 from the one-time password issuing unit 101 in the first exemplary embodiment is described as follows. In the one-time password issuing unit 101 in the first exemplary embodiment, the URL for the registration is sent back with the one-time password to the upload requesting user PC 202. However, in the password issuing unit 301, the e-mail address for the registration is sent back together with the one-time password to the upload requesting user PC 402. The e-mail address for the registration is the address for registering the electronic document on the document storage system 300.

The process conducted by the one-time password issuing unit 301 in the present exemplary embodiment is almost the same as the process by the one-time password issuing unit 101 in FIG. 4A of the first exemplary embodiment. The difference is that, in step s1015, the set of information is in the form of an e-mail when the message that the registration was successful and information including the generated one-time password are sent back to the upload requesting user PC 402. The process conducted by the document management unit 520 in FIG. 4B in response to FIG. 4A is the same.

Figure 11:
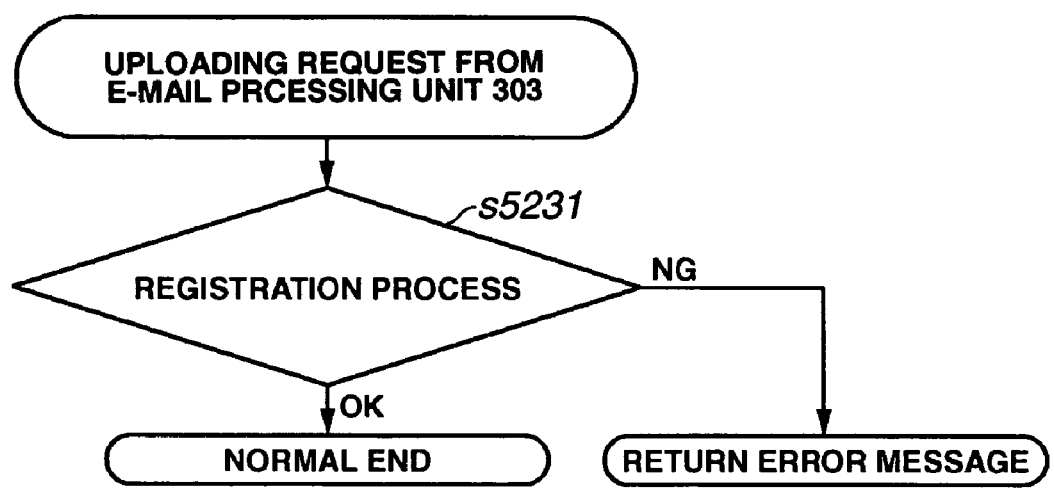
FIG. 11 is a flowchart of the process in which a registration processing unit registers an electronic document which the user requests to upload, on a document management DB

Besides, the one-time password management unit 102 in the first exemplary embodiment confirms the one-time password based on the request from the one-time password upload processing unit 103. The one-time password management unit 302 in the present exemplary embodiment only differs in that the one-time password is confirmed based on the request from the e-mail processing unit 303. FIG. 11 can be executed instead of FIG. 6B in the first exemplary embodiment called by the process of S1037. Therefore, the process conducted by the one-time password management unit 302 is almost the same as the process of registering the one-time password and the specified information by the one-time password management unit 102.

The process of registering an electronic document by the document management unit 520 is shown in FIG. 11. In the present exemplary embodiment, the process in FIG. 11 starts in response to the upload request from the e-mail processing unit 303, and the result of the registration process is also sent back to the e-mail processing unit 303. As shown in FIG. 11, registering process unit 522 uploads electronic document requested to document management unit 520. And at step s5231, registering process unit 522 returns result of the process to the one time password upload processing unit 103.

The process of confirming the validity of the password by the one-time password management unit 302 is the same as the process shown in FIG. 7 in the first exemplary embodiment.

Figure 9:
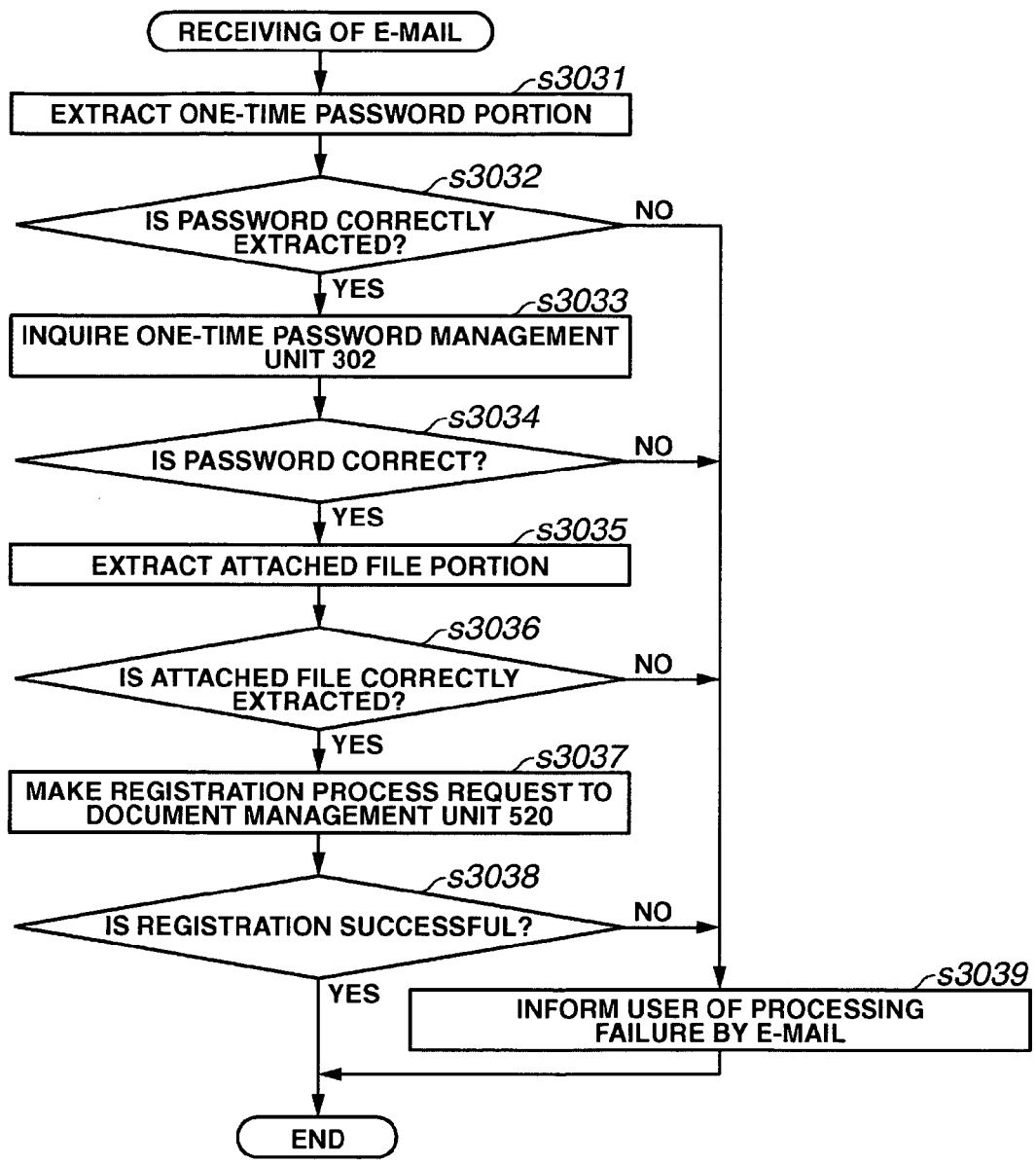
FIG. 9 is a flowchart of the e-mail receiving process in an e-mail processing unit.
Figure 10:
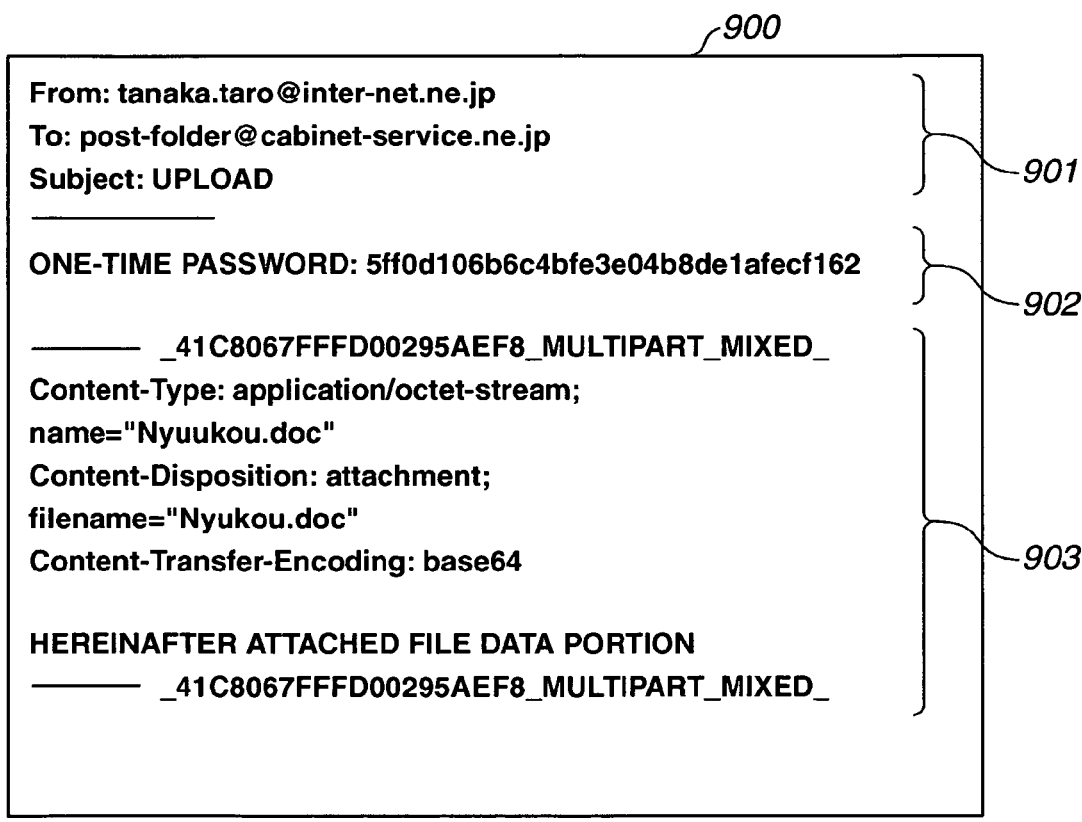
FIG. 10 illustrates an example of an e-mail received by the e-mail processing unit from a loading user PC.

The e-mail processing unit 303 confirms the contents of the e-mail received from the uploading user PC 412 in collaboration with the one-time password management unit 302. If it is determined that an e-mail with the correct one-time password is received, the document is registered in the document management unit 520. FIG. 9 is a flowchart of the e-mail receiving process by the e-mail processing unit 303. As a precondition for conducting the process in FIG. 9, the e-mail processing unit 303 receives an e-mail that requests upload, including the one-time password, from the uploading user PC 412. An example of an e-mail received by the e-mail processing unit 303 from the uploading user PC 412 is described below. FIG. 10 shows an example of the content of the e-mail received by the e-mail processing unit 303 from the uploading user PC 412. In FIG. 10, the e-mail 900 includes a header 901, a one-time password section 902 and a file attaching section 903. The destination and the name of subject are described in the header 901. The one-time password is described in the one-time password section 902. The uploaded electronic document is attached in the file attaching section 903.

As shown in FIG. 9, in step s3031, the e-mail processing unit 303 extracts the one-time password section 902 from the e-mail received from the uploading user PC 412. In step s3032, the e-mail processing unit 303 determines whether the one-time password section 902 was extracted successfully in step s3031. If it is determined that the one-time password section 902 was successfully extracted, the e-mail processing unit proceeds to step s3033 and inquires the one-time password management unit 302 to determine whether the one-time password is a correct password that is already registered. The one-time password management unit 302 proceeds to determine the validity of the one-time password in a process similar to the process shown in FIG. 7 and sends back the result to the e-mail processing unit 303.

If it is determined that the one-time password is valid based on the message from the one-time password management unit 302, the e-mail processing unit 303 proceeds from step S3034 to step s3035 and extracts the file attaching section 903 from the e-mail, and stores it in the temporary storage folder in the database unit 15 of the document management system 100 as in the first exemplary embodiment. The name of the temporary storage folder to be used here is associated with the one-time password and is stored in the one time password DB 102-DB in the one-time password management unit 102. The temporary storage folder name is determined by automatic generation as one of the specific information when the one-time password is generated in step s1013. The one-time folder name can also be automatically generated when the uploading process is conducted in step s1036. In addition, a plurality of files can be attached to the file attaching section 903. In a case where a plurality of files is attached, the e-mail processing unit 303 conducts the process in step s3035 as many times as the number of files attached.

In step s3036, the e-mail processing unit 303 determines whether the attached file was successfully extracted in step s3035. If it is determined that the attached file was extracted correctly, the e-mail processing unit 303 proceeds to step s3037 and requests the document management unit 520 to conduct the registration process. In this registration process request, three types of information are sent to the document management unit 520. The first information is the name of the folder in which the file is to be ultimately stored. The second information is the upload requesting user name for setting the owner of the registered file. The third information is the temporary storage folder name in which the file was temporarily stored. These three types of information are searched and obtained from the one-time password DB 102-DB using the one-time password as the key. Accordingly, the document management unit 520 conducts the same registration process as in FIG. 11 of the first exemplary embodiment and returns the result to the e-mail processing unit 303. In addition, the electronic document which was requested to be uploaded and stored in the temporary storage folder is deleted after the process returns from the registering into document management unit 520, irrespective of whether the registration was successful.

In step s3038, the e-mail processing unit 303 confirms whether the registration process was successful. If it is determined that the registration process was successful, the e-mail processing unit 2303 ends the process. In the case where the result was negative in any one of steps s3032, s3034, s3036, and s3038, the e-mail processing unit 303 proceeds to step s3039 and informs the uploading user PC 412 of the uploading user 411 by e-mail that the e-mail registration was not successful. The uploading user PC 412 is a computer terminal used by the uploading user 411, in which a common, e-mail software is installed for sending and receiving e-mail. Besides, in the above first and second exemplary embodiments, the one-time password upload processing unit 103 and the e-mail processing unit 303 may inform the upload requesting user 201 and 401 that the uploading is completed.

Other Exemplary Embodiments

In the above first and second exemplary embodiments, it is necessary for the upload requesting user 201 and 401 to inform the uploading user 211 and 411 of the URL and the one-time password to be uploaded by using a separate means. The one-time password issuing unit 101 and 301 may inform the uploading user 211 and 411 of the URL and the one-time password by e-mail.

In addition, the functions of the processing units as shown in FIGS. 1B and 8B in the above exemplary embodiments are realized by a computer program performing such functions that are read out from the memory (ROM 13 and the system DB 15) and executed by the CPU 11.

The present invention is not limited to the above configuration and the functions of all or part of the processing units in FIGS. 1B and 8B may be realized by a dedicated hardware. In addition, the memory described above is not limited to ROM 13 or system DB 15, and a magnetic optical disk device, nonvolatile memory such as flash memory, read-only storage medium such as the CD-ROM, or computer readable or writable storage medium combining these mediums may be used.

Furthermore, a computer program for realizing the functions of the processing units in FIGS. 1B and 8B may be recorded in a computer readable storage medium that can be read out and executed by a computer system. The "computer system" referred to here includes an operating system (OS) and hardware such as a peripheral device. More specifically, the present invention includes the case where a function of the above exemplary embodiments is realized by a computer program read out from the storage medium which is written in the memory in the function enhancement board inserted in the computer or the function enhancement unit connected to the computer. In this case, according to instructions given by the computer program, the CPU in the function enhancement board or the function enhancement unit conducts a part or all of the actual processes.

Moreover, "a computer readable storage medium" is a storage device such as a flexible disk, magnetic optical disk, ROM, a portable medium such as a CD-ROM, or a hard disk installed within a computer system. In addition, "a computer readable storage medium" includes a storage medium which stores a program for a certain length of time, such as a volatile memory (RAM) inside a computer system which acts as a server or a client in the case where a program is sent through a network such as the Internet or a communication line such as a phone line.

Furthermore, the above computer program may be transmitted from a computer system storing the program in a storage device to other computer systems through a transmission medium or by a transmitted wave in the transmission medium. "A transmission medium" is a medium such as a network (communication network) including the Internet or a communication line including the phone line having a function of transmitting information.

In addition, the above computer program may realize a part of the functions described above. Furthermore, the above computer program may be a difference file (difference program) which realizes the above functions in combination with a computer program already stored in the computer system. Moreover, the present invention can be applied to a computer program product such as a computer readable medium which stores the above program as an exemplary embodiment. The above computer program, storage medium, transmission medium, and computer program product are included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2005-111069 filed Apr. 7, 2005 and 2006-081281 filed Mar. 23, 2006 which are hereby incorporated by reference herein in their entirety.

What is claimed is:

1. A data storage device that is accessible by a specific user, the data storage device comprising:
   an issuing unit configured to issue authentication information to confirm that a second user other than the specific user has a right to use a predetermined storage area;
   a registering unit configured to register the authentication information and a folder path as a pair after authentication information is issued by the issuing unit, wherein a URL (Uniform Resource Locator) including the authentication information is sent to a terminal operated by the second user from a terminal of the specific user;
   an obtaining unit configured to obtain a request to store data sent from the terminal operated by the second user and the authentication information issued by the issuing unit, wherein the obtaining unit extracts the authentication information from the URL included in the request to store data, and wherein an authentication unit performs authentication based on the extracted authentication information without requiring input of the authentication information by the second user;
   a sending unit configured to specify a folder path registered with the authentication information in pairs in accordance with a success of the authentication by the authentication unit and send a registration screen for uploading data to the specified folder path to the terminal operated by the second user, wherein the registration screen is not sent to the terminal operated by the second user when authentication is not successful; and
   a storage unit configured to store data which is selected by the second user via the registration screen sent by the sending unit and which is to be input,
   wherein the specific user requests the issuing unit to issue the authentication information for the second user.

2. The data storage device according to claim 1, wherein the authentication information comprises an indication of a number of times the authentication information is usable.

3. The data storage device according to claim 2, wherein the authentication information comprises an indication of a valid period of time of the authentication information.

4. The data storage device according to claim 3, wherein the issuing unit issues to the terminal of the second user specified information for specifying the storage area that is used by the terminal of the second user, and further comprising a transferring unit configured to transfer data designating the specified information to the predetermined storage area, an access right to which is given to the specific user, when the data designating the specified information is stored.

5. The data storage device according to claim 1, wherein the authentication information includes at least one of a specific password, a random number, and information encoded by a specific algorithm, and is notified to a user or a terminal having an access right.

6. A method of storing data that is accessible by a specific user, the method comprising:
   issuing authentication information for confirming that a second user has a right to use a predetermined storage area;
   registering the authentication information and a folder path as a pair after authentication information is issued, wherein a URL (Uniform Resource Locator) including the authentication information is sent to a terminal operated by the second user from a terminal of the specific user;
   obtaining a data registration request sent from the terminal operated by the second user and the authentication information that was issued;
   extracting the authentication information from the URL included in the data registration request;
   performing authentication based on the extracted authentication information without requiring input of the authentication information by the second user;
   specifying a folder path registered with the authentication information in pairs in accordance with a success of the authentication;
   sending a registration screen for uploading data to the specified folder path to the terminal operated by the second user, wherein the registration screen is not sent to the terminal operated by the second user when authentication is not successful; and
   storing data which is selected by the second user via the registration screen sent and which is to be input,
   wherein the specific user requests issuing the authentication information for the second user.

7. The method of storing data according to claim 6, wherein the authentication information comprises an indication of a number of times that the authentication information is usable.

8. The method of storing data according to claim 7, wherein the authentication information comprises an indication of a valid period of time of the authentication information.

9. The method of storing data according to claim 8, wherein specified information for specifying the storage area that is used by the terminal of the second user is issued, and further comprising transferring the data designating the specified data to the predetermined storage area, an access right to which is given to the specific user, when the data designating the specified information is stored.

10. The method of storing data according to claim 6, wherein the authentication information includes at least one of a specific password, a random number, and information encoded by a specific algorithm, and is notified to a user or a terminal having an access right.

11. A non-transitory computer-readable medium having stored thereon control program for implementing a method of storing data that can be accessed by a specific user, the method stored on the computer-readable medium comprising:

issuing authentication information for confirming that a second user has a right to use a predetermined storage area;

registering the authentication information and a folder path as a pair after authentication information is issued, wherein a URL (Uniform Resource Locator) including the authentication information is sent to a terminal operated by the second user from a terminal of the specific user;

obtaining a data registration request sent from the terminal operated by the second user and the authentication information that was issued;

extracting the authentication information from the URL included in the data registration request;

performing authentication based on the extracted authentication information without requiring input of the authentication information by the second user;

specifying a folder path registered with the authentication information in pairs in accordance with a success of the authentication;

sending a registration screen for uploading data to the specified folder path to the terminal operated by the second user, wherein the registration screen is not sent to the terminal operated by the second user when authentication is not successful; and storing data which is selected by the second user via the registration screen sent and which is to be input, wherein the specific user requests issuing the authentication information for the second user.

* * * * *